(12) United States Patent
Lee et al.

(10) Patent No.: US 7,887,736 B2
(45) Date of Patent: Feb. 15, 2011

(54) SUPERHYDROPHOBIC POLYMER FABRICATION

(75) Inventors: Jin-Kyu Lee, Seoul (KR); Yuwon Lee, Chungcheongnam-do (KR); Kuk-Youn Ju, Gyeonggi-do (KR)

(73) Assignee: Seoul National University Research & Development Business Foundation (SNU R&DB Foundation)

( * ) Notice: Subject to any disclaimer, the term of this patent is extended or adjusted under 35 U.S.C. 154(b) by 0 days.

(21) Appl. No.: 12/234,560

(22) Filed: Sep. 19, 2008

(65) Prior Publication Data
US 2009/0246473 A1    Oct. 1, 2009

(30) Foreign Application Priority Data
Mar. 27, 2008    (KR) .................... 10-2008-0028188

(51) Int. Cl.
*B27N 3/18*    (2006.01)
(52) U.S. Cl. .......................... 264/319; 216/83; 216/96; 216/100; 216/102; 216/103; 216/104
(58) Field of Classification Search ............... 264/319; 216/83, 96, 100, 102, 103, 104
See application file for complete search history.

(56) References Cited

PUBLICATIONS

Y. Lee, S.-Y. Park, K-B. Kim, J-K. Lee, "Fabricatino of Hierarchical Structures on a Polymer Surface to Mimic Natural Superhydrophobic Surfaces", Adv. Mater (2007), 19, 2330-2335. Published Online Aug. 2, 2007.*

T.S. Kustandi, V.D. Samper, W.S. Ng, A.S. Chong, H. Gao, "Fabrication of a gecko-like hierarchical fibril array using a bonded porous alumina template", J. Micromech. Microeng. 2007, 17(10), N75-N81.*

K.R. Williams, "Etch Rates for Micromachining and IC processing (A/min)", U.C. Berkley Microfabrication Laboratory/Berkley Sensor and Actuator Center, Jul. 29, 1996. http://engineering.dartmouth.edu/microeng/processing/etching/etchelectr.pdf.*

B. Qian, Z. Shen, "Fabrication of Superhydrophobic Surfaces by Dislocation-Selective Chemical Etching on Aluminum, Copper, and Zinc Substrates", Langmuir 2005, 21, 9007-9009.*

* cited by examiner

*Primary Examiner*—Christina Johnson
*Assistant Examiner*—Elizabeth Royston
(74) *Attorney, Agent, or Firm*—Knobbe, Martens, Olson & Bear, LLP

(57) ABSTRACT

A superhydrophobic polymer fabrication is provided. According to one method for preparing a superhydrophobic polymer fabrication, the superhydrophobic polymer fabrication can be fabricated quickly and easily, and the superhydrophobic surface can be repeatedly imprinted using a template, so that mass production of the superhydrophobic polymer fabrication over a large area can be economically implemented.

18 Claims, 6 Drawing Sheets

Etched Al surface for 5s at 10 °C    Etched Al surface for 5s at 70 °C

SUPERHYDROPHOBIC POLYMER FABRICATION

TECHNICAL FIELD

The present disclosure relates generally to techniques for forming a superhydrophobic surface.

BACKGROUND

People are surrounded by and exposed to the surfaces of objects every day. Accordingly, extensive research has been conducted with regards to what phenomena occur on the surfaces that people often come into contact with, and how to treat or prepare these surfaces to make life more comfortable. Superhydrophobicity is a physical property of a surface whereby the surface is extremely difficult to wet with water. For example, the leaves of plants, insect wings, or the wings of birds have a property which enables any external contaminants to be removed without requiring any specific removal process and prevents contamination in the first place. This is possible because the leaves of plants, insect wings, and the wings of birds are superhydrophobic (see W. Barthloot and C. Neinhuis, *Planta*, 1997, 202, pp. 1-8).

An object applied with a superhydrophobic surface can demonstrate properties such as being waterproof, dirt-proof, etc. Therefore, techniques for forming a superhydrophobic surface can be useful in various industrial fields. However, the methods for forming an artificial superhydrophobic surface have been technically inadequate up to now.

DETAILED DESCRIPTION

Figure 1:
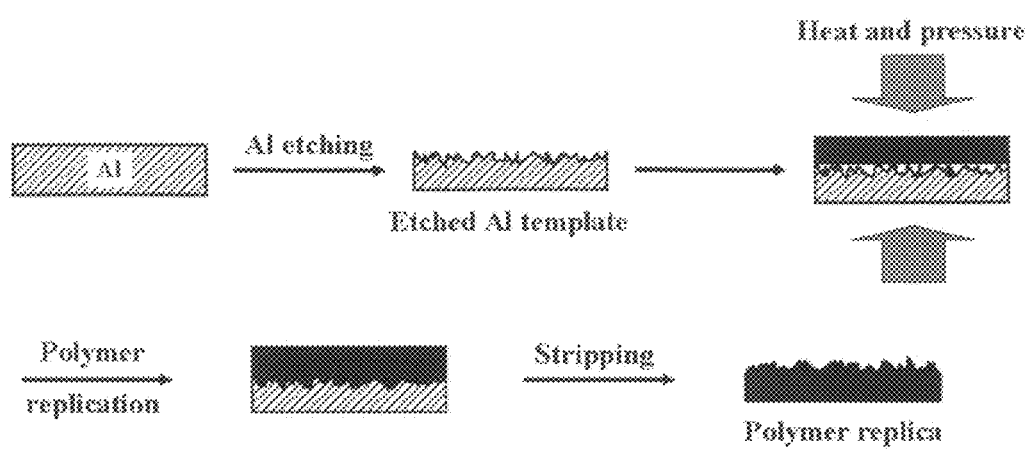
FIG. 1 is a schematic diagram of an illustrative embodiment of a method for preparing a superhydrophobic polymer fabrication.

A representative example of superhydrophobicity is the surfaces of plant leaves exhibiting the Lotus effect. In the present disclosure, as methods for creating a surface of an object exhibiting superhydrophobicity, techniques have been studied so that the object has a biomimetic surface like the surfaces of plant leaves exhibiting the Lotus effect.

This disclosure is drawn, inter alia, to methods for preparing a superhydrophobic polymer fabrication, a template, and a superhydrophobic polymer fabrication prepared by the method.

In one embodiment, a method for preparing a superhydrophobic polymer fabrication comprises forming a micron-sized terrace structure and a nano-sized groove structure within the terrace structure on a surface of a template by chemical etching, applying heat and pressure to a polymer placed on the etched template, thereby enabling a polymer fabrication to be replicated from the etched template, and removing the replicated polymer fabrication from the etched template.

In order to allow for its practical application, the superhydrophobic surface should include one or more of the following properties: being simple to prepare, being inexpensive, being producible over a large area, and being applicable to any object having various shapes.

In order for the superhydrophobic surface to have one or more of the above-described properties, a suitable material needs to be selected on which the superhydrophobic surface is to be formed. For example, when the superhydrophobic surface is formed on the surface of a metal or rigid ore, the preparation procedure may be difficult, more expensive, difficult to implement over a large area and not suitable for mass production. For example, even though it is reasonably simple to prepare a superhydrophobic surface on the surface of a metal or rigid ore, it is difficult to apply the metal or rigid ore with a superhydrophobic surface onto other objects. In contrast, a polymer fabrication having a superhydrophobic surface may be applied or coated easily onto objects having various shapes due to the pliability of polymer fabrications. In addition, the polymer fabrication will provide an advantage in that it is easy to handle and is cheaper to prepare.

A method for forming a superhydrophobic surface on a surface of a polymer fabrication is provided. In some embodiments, the method includes manufacturing a template for replicating the superhydrophobic surface to the polymer fabrication, and imprinting the template on the polymer fabrication. Such a method may repeatedly use the template to replicate the superhydrophobic surface onto the polymer fabrication, so that the preparation method enables mass production of the superhydrophobic polymer fabrication.

In one embodiment, a superhydrophobic polymer fabrication is provided, in which a micron-sized terrace structure is formed on a surface of the superhydrophobic polymer fabrication. In addition, a nano-sized fiber structure is formed on the micron-sized terrace structure.

The term "terrace structure" as used herein refers generally to a surface structure formed of amorphous fragments irregularly distributed on the surface of the substrate.

The term "fiber structure" as used herein refers generally to a surface structure where amorphous fibers shaped like grass are formed on the surface of the substrate.

The term "micron-sized" as used herein, although not limited hereto, may be interpreted as 1 to several thousand micrometers.

The term "nano-sized" as used herein, although not limited hereto, may be interpreted as 1 to several thousand nanometers.

In order to prepare the superhydrophobic polymer fabrication having the micron-sized terrace structure and the nano-sized fiber structure on the surface, a template may be used for allowing such structures to be formed on the surface of the polymer fabrication by means of imprinting.

The structure of the template corresponds to the superhydrophobic surface of the superhydrophobic polymer fabrication to be prepared. Accordingly, the template may have a micron-sized terrace structure formed on its surface. A nano-sized groove structure may be formed on the micron-sized terrace structure. The term "groove structure" refers generally to the surface structure recessed by chemical etching, and it corresponds to the fiber structure.

The micron-sized protrusion structure observed in the leaves of plants exhibiting the Lotus effect is relatively regular and shows a fixed form. An etching method, such as photolithography, may be used to make a template for fabricating a biomimetic surface. The biomimetic surface may have a regular and fixed form protrusion structure. However, when photolithography is used, there is a limit to the surface treatment area, it is difficult to control a profile of the surface to be formed by photolithography, and in particular, it is technically very complicated and difficult to form the biomimetic hierarchical surface.

A regular and fixed form protrusion structure is not necessarily required for obtaining superhydrophobicity. This is because the same effect as the water molecules floating in the air may be achieved with a nano-sized fiber structure present on the micron-sized protuberance structure even when the regular and fixed form protrusion structure is not formed. Accordingly, the micron-sized protuberance structure does not need to be regular nor a fixed form.

Therefore, to biomimetically implement a micron-sized protuberance structure of an organism as stated above, in one embodiment of the present disclosure a micron-sized terrace structure is formed by chemically etching a template instead of forming the regular and fixed form protuberance structure. Accordingly, the complicated procedure associated with the template preparation for forming the regular and fixed form protuberance structure is avoided.

When the template is chemically etched, a micron-sized terrace structure and a nano-sized groove structure within the terrace structure are formed on the surface of the template without requiring a separate complicated procedure.

Any suitable material may be used to form a template for preparing a superhydrophobic surface polymer fabrication so long as the material enables a micron-sized terrace structure and a nano-sized groove structure within the terrace structure to be formed on the surface of the template when the template is chemically etched. Moreover, it may be further beneficial to use a material which exhibits one or more of the following characteristics: is easy to handle, is relatively inexpensive, and facilitates formation of a hierarchical structure in which the terrace structure and the groove structure are combined.

In one embodiment, the template may be formed of metal. In the case of a metal template, chemical etching may be easily carried out in a short amount of time and the hierarchical structure may be easily formed. Any metal, such as, by way of example and not a limitation, aluminum, tin, titanium, iron, copper, zinc, nickel, tungsten or an alloy thereof, may be used to form the template. The metal for forming the template should be easy to handle, be lightweight, facilitate surface treatment, be inexpensive, and have high wear-resistance, even when imprinting is repeatedly carried out during the preparation process. For example, aluminum may be used because it is very light, has satisfactory wear-resistance, is relatively inexpensive, and causes a biomimetic hierarchical structure to be clearly formed at the time of chemical etching.

In one embodiment, chemical etching using a suitable etchant may be used to form the terrace structure and groove structure on the surface of the template. The etchant may be one which allows a terrace-shaped texture to be formed on the surface. The etchant may comprise a mixture of at least one of the following solutions: $HNO_3$, $H_3PO_4$, $H_2SO_4$, $H_2CrO_4$, HCl, HF, $NH_4OH$, NaOH, KOH etc. The etchant may be changed according to the type of material used to form the template. The compositions of the etchant which may be used with respect to the metal are exemplified in "Vander Voort, G. F., "Metallography: Principles and Practice", McGraw-Hill, New York, 1984", which is hereby incorporated by reference herein in its entirety. For example, the etchant for etching Al may include a mixture of HCl, $HNO_3$ and HF (50:47:3), a mixture of acetic anhydride and perchloric acid (2:1), a mixture of methanol, $HNO_3$, HCl, HF and water (50:50:32:2:50), a mixture of HCl, water and HF (80:25:5), etc, and the etchant for etching Cu may include a mixture of $FeCl_3$, HCl, acetic acid and $Br_2$ (20:20:5:2), a mixture of $H_3PO_4$ and water (60:40), a mixture of ammonium persulfate and ammonium chloride (70:0.5) in $NH_4OH$, etc.

For example, when an etchant comprising hydrogen chloride (HCl) and hydrogen fluoride (HF) is used as the etchant on aluminum, HCl acts to directly etch the aluminum, and HF acts to remove the small amount of impurities contained in aluminum, such as Fe or Si, to help HCl uniformly etch the surface of the template. When the material forming the template is changed, the components of the etchant to carry out such actions may be changed accordingly.

In one embodiment, the formation of the terrace structure and groove structure of the template may be controlled by adjusting the temperature or the duration of etching. For example, when metal is etched as the template, the micron-sized terrace structure may be formed at a low temperature ranging from 0° C. to room temperature. An exothermic reaction between the metal and the etchant causes the reaction temperature to increase over time, which allows the nano-sized groove structure to be formed at a high temperature ranging from 60° C. to 100° C. Therefore, the temperature or etching time may be properly adjusted to form the desired hierarchical structure on the surface of the template. The temperature at which the etching is carried out may be adjusted, for example, in the range of 0° C. to 100° C., and the time at which the etching is carried out may be adjusted, for example, in the range of 1 second to 10 minutes.

As such, the template with the micron-sized terrace structure and the nano-sized groove structure within the terrace structure formed on the surface of the template by the chemical etching may be used for forming a superhydrophobic polymer fabrication having a biomimetic surface.

To this end, a procedure comprising applying heat and pressure to a polymer placed on the etched template, replicating the polymer fabrication from the etched template, and removing the replicated polymer fabrication from the template may be performed.

The template for imprinting the polymer fabrication may have any shape. The shape of the template may be changed according to the desired shape of the polymer fabrication to be prepared. For example, the template may be shaped, without limitation, like a plate or a cylinder. When the polymer fabrication is replicated from a template having a plate shape, the shape of the plate may be properly set to make the polymer fabrication with a desired external shape. In addition, when the polymer fabrication is replicated from a template having a cylindrical shape, for example, a roll-to-roll process may be applied for implementing mass production of the polymer fabrication over a large area.

The polymer fabrication replicated from the template by the method as described above may have a nano-sized fiber structure on a micron-sized terrace structure formed on a surface of the polymer fabrication. When the surface of the template having the micron-sized terrace structure and the nano-sized groove structure recessed by chemical etching is imprinted on a surface of the polymer, the surface of the polymer fabrication has a micron-sized terrace structure and a nano-sized fiber structure which protrude in opposite directions.

It is beneficial to use a polymer having properties that enable the replications from the template to the surface of the polymer fabrications to be carried out easily and correctly, and that enable the resulting structure to remain intact. Any polymer may be used so long as it is flexible and has appropriate intensity.

In one embodiment, the polymer is a thermoplastic polymer. A thermoplastic polymer is a polymer which undergoes plastic deformation when heated, but becomes reversibly rigid when cooled down. When such a thermoplastic polymer is used for replicating the template, the polymer becomes flexible due to heat and pressure, so it is easy to replicate a structure such as the recessed structure onto the template. When the polymer becomes rigid by cooling and then removed from the template, the structure formed by the replication may be maintained.

The thermoplastic polymer may include, but is not limited to, for example, polyester including polyethylene terephthalate (PET), polytrimethylene terephthalate (PTT), polybutylene terephthalate (PBT) and polyethylene naphthalate (PEN); polyalkylene including polyethylene (PE) and polypropylene (PP); vinyl polymer including polyvinyl chloride (PVC); polyamide; polyacetal; polyacrylate including polymetyl methacrylate (PMMA); polycarbonate; polystyrene; polyurethane; acrylonitril-butadiene-styrene copolymer (ABS); halogenated polyalkylene; polyarylene oxide; and polyarylene sulfide.

The superhydrophobic polymer fabrication prepared by the above method may be quickly and easily mass produced over a large area. The superhydrophobic polymer fabrication may be applicable to any field requiring superhydrophobicity. For example, it may be widely applied to applications for preventing loss due to water, preventing or blocking contamination, and so forth. The superhydrophobic polymer fabrication, although not limited hereto, may be coated or applied to provide properties such as being waterproof, dirt-proof, anti-freezing, anti-fogging, or self-cleaning, etc. For example, the superhydrophobic polymer fabrication may be coated on a car's body to block contamination and prevent the car from being steamed up, coated on a bottom of a vessel to prevent the vessel from being encrusted with slime, coated on a surface of a large-sized antenna to prevent the formation of snow or ice, coated on an internal surface of a water transport pipe to prevent corrosion and contamination and enhancing water fluidity, or applied to a water-repellent system in a greenhouse.

Hereinafter, a method of preparing the superhydrophobic polymer fabrication will be described with respect to a specific example. In addition, experiments to determine whether or not the polymer fabrication surface exhibits superhydrophobicity by measuring contact angles of a waterdrop with respect to the surface of the polymer fabrication prepared through the example method are disclosed. The experimental results show that the surface of the polymer fabrication having a hierarchical structure exhibits good superhydrophobicity.

In addition, the experimental examples below illustrate the stability and self-cleaning effect of the polymer fabrication surface in various solvents and solutions having various pHs.

The present disclosure provides a method for forming a biomimetic superhydrophobic surface on a polymer fabrication in a simple and easy manner. According to the method, the superhydrophobic polymer fabrication may be prepared quickly and easily, and the superhydrophobic surface may be repeatedly imprinted using a template, so that mass production of the superhydrophobic polymer fabrication over a large area may be economically implemented. In addition, the superhydrophobic polymer fabrication formed by the method maintains superhydrophobicity and has a good self-cleaning effect without causing the surface structure to be changed in various solutions and solvents of various pHs.

The present disclosure will be further made clear from the following examples described in detail. However, it is to be understood that the present disclosure is not limited thereto, but may be otherwise variously embodied and practiced.

Those of ordinary skill will appreciate that, for this and other processes and methods disclosed herein, the functions performed in the processes and methods may be implemented in differing order. Furthermore, the outlined steps and operations are provided only as examples, and some of the steps and operations may be optional, combined into fewer steps and operations, or expanded to include additional steps and operations without detracting from the essence of the present disclosure.

EXAMPLE

Preparation of Superhydrophobic Polymer Fabrication

FIG. 1 is a schematic diagram of an illustrative embodiment of a method for preparing a superhydrophobic polymer fabrication. As shown in FIG. 1, an Al plate is etched to form an aluminum template having a hierarchical structure. Heat and pressure are then applied to a polymer placed on the template. Then, a polymer fabrication is replicated from the template to prepare the superhydrophobic polymer fabrication.

(1) Preparation of Aluminum Template and Analysis of Surface Structure Change of the Template An aluminum (Al) plate was used as a template for preparing the superhydrophobic polymer fabrication.

A commercially available Al plate (99.0%, 2>3>0.3 cm) was dipped into an etchant comprising HCl and HF (HCl:HF: $H_2O$=40 ml:2.4 ml:12.5 ml) and etching was performed at room temperature for each of 10 s, 20 s, 30 s, 40 s, 50 s, 60 s, 120 s, 240 s, 480 s, respectively. After etching, the plate was cleaned with water several times, dried with $N_2$ gas and then stored.

The surface of the Al plate was analyzed using FE-SEM (Hitachi, s-4300).

Figure 2:
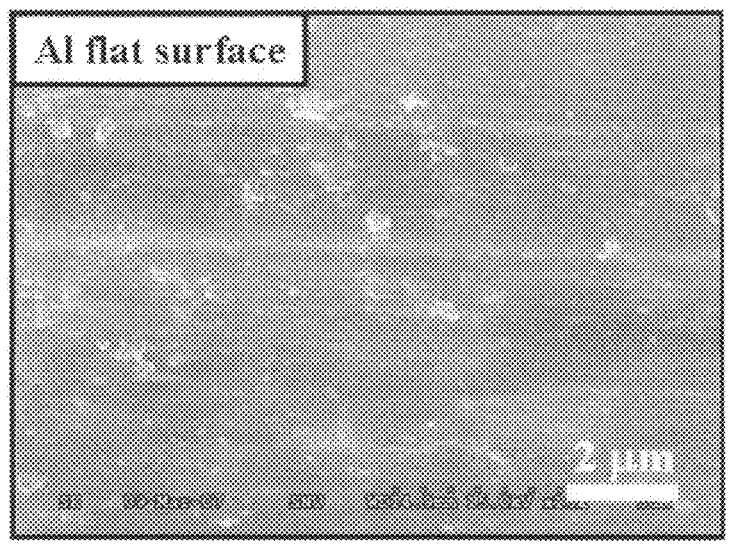
FIG. 2 shows an illustrative embodiment of a Field Emission-Scanning Electron Microscope (FE-SEM) photograph of an untreated aluminum surface.

FIG. 2 shows an illustrative embodiment of an FE-SEM photograph of an untreated aluminum surface. It can be seen that, although the aluminum does not have a smooth structure over the entire surface, the aluminum has a substantially flat structure.

Figure 3:
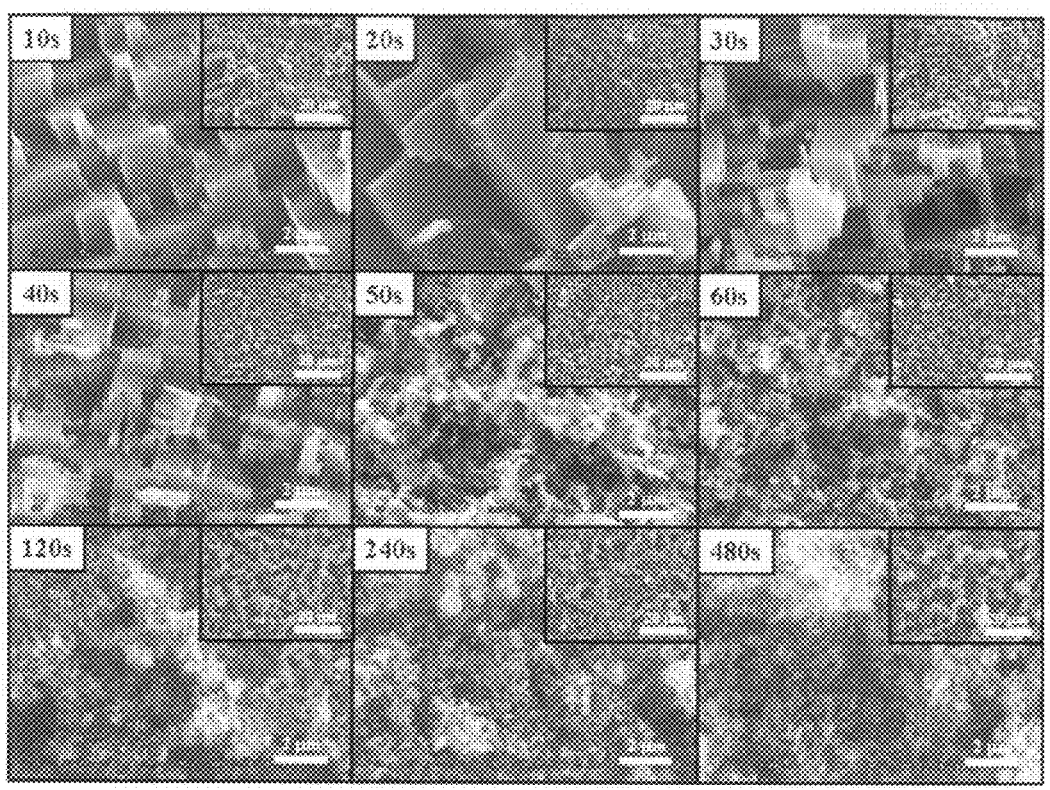
FIG. 3 shows an illustrative embodiment of FE-SEM photographs illustrating changes in surface structure of Al etched by an etchant for the respective times.

FIG. 3 shows an illustrative embodiment of FE-SEM photographs illustrating changes in surface structure of Al etched by an etchant for the respective times. As shown in FIG. 3, the surface of Al etched for a short time has a micron-sized terrace structure. However, it can be seen that the micron-sized terrace structure formed at an initial stage is transformed when the etching time is gradually increased. A nano-sized groove structure is formed on the surface of the micron-sized terrace structure, so the hierarchical structure is gradually increased.

(2) Analysis of Correlation Between Structure Change of Aluminum Template Surface and Temperature The etchant carries out etching by first attacking defects exposed to the Al surface and imperfect portions of the Al crystal. This should lead to the Al surface having an almost similar structure regardless of the etching time, however, as illustrated by FIG. 3, the surface structure of Al changes according to the etching time. An analysis of the correlation between the temperature and the structure change was performed to determine why the micron-sized structure is transformed into the nano-sized structure due to the increasing etching time.

Figure 4:
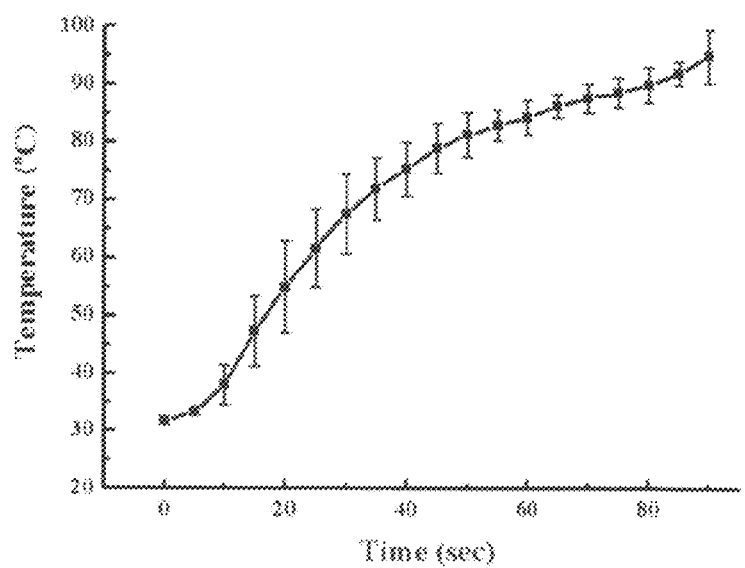
FIG. 4 shows an illustrative embodiment of a graph illustrating increasing reaction temperatures versus etching time.

FIG. 4 shows an illustrative embodiment of a graph illustrating increasing reaction temperatures versus etching time. As shown in FIG. 4, the first etching starts at room temperature, and the reaction temperature is increased up to about 100° C. as the etching time is increased. It may be assumed that the micron-sized structure is generated because the etching reaction is not actively carried out at room temperature, and then more actively etched to a smaller size because the reaction temperature increases over the etching time to cause the etching reaction to be actively carried out, thereby leading to a nano-sized structure on the Al surface.

Figure 5:
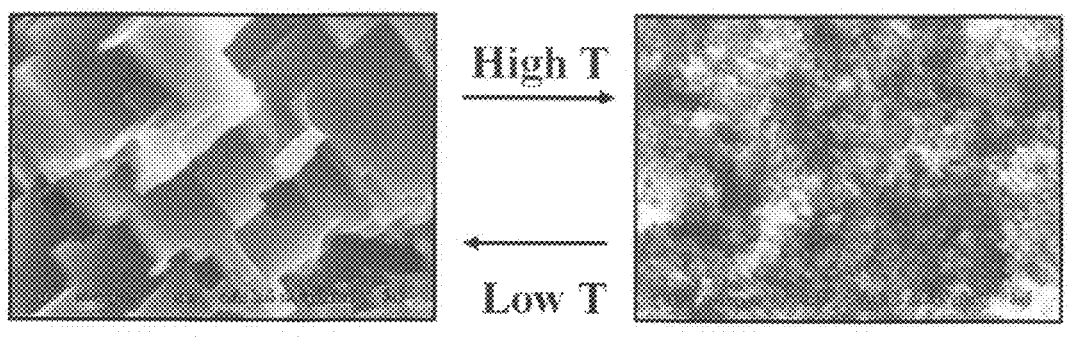
FIG. 5 shows an illustrative embodiment of photographs of a surface structure of Al etched for a short time at low and high temperatures.

Structure changes were observed by adjusting the reaction temperature based on such an assumption. FIG. 5 shows an illustrative embodiment of photographs of an Al surface structure etched for a short time at low and high temperatures, respectively. As shown in FIG. 5, the micron-sized structure is obtained when Al is etched for a short time at a low temperature, and the nano-sized structure is obtained when Al is etched for a short time at a high temperature. The results of the experiment confirmed that the nano-sized structure without the micron-sized structure could be obtained when etching was carried out for a short time (1 second to 10 seconds) at a high reaction temperature (not less than about 70° C.), but the micron-sized structure was maintained without producing the nano-sized structure even when etching was carried out for a long time (not less than about 30 seconds) at a low temperature (about 0° C.). In addition, it was shown that the nano-sized structure was formed when etching was performed on the Al template in which the micro-sized structure was already formed for a short time (5 seconds to 10 seconds) at a high temperature (about 70° C.), and the micron-sized structure was formed again when etching was performed on the Al template having such a nano-sized structure at a low temperature (about 10° C.). It was confirmed that the same phenomenon was observed even when the procedure as described above was repeatedly performed. Therefore, the formation of the micron-sized structure or the nano-sized structure may be controlled by adjusting the temperature or etching time.

In addition, an experiment was performed to determine how the components of the etchant affect the Al etching. The experiment showed that HCl directly etched the Al, and the etching could not be performed uniformly over the whole area of Al when only the HCl etches the Al. However, Al was barely etched when etching was carried out with HF only. In the case of Al plate, a small amount of Fe and Si are uniformly mixed with Al. Accordingly, it was confirmed that HF removes such impurities to help HCl uniformly etch the Al surface.

(3) Preparation of Polymer Fabrication and Analysis of Structure Change of the Polymer Fabrication Surface The Al templates fabricated as described above were used to carry out polymer replication of HDPE for about 20 minutes by the method using heat and pressure. In the case of HDPE, the polymer replication was carried out at about 150° C., which was then cooled down at room temperature, and the template was removed from the replica by a stripping method.

The surfaces of the polymer replicas were analyzed using FE-SEM (Hitachi, s-4300).

Figure 6:
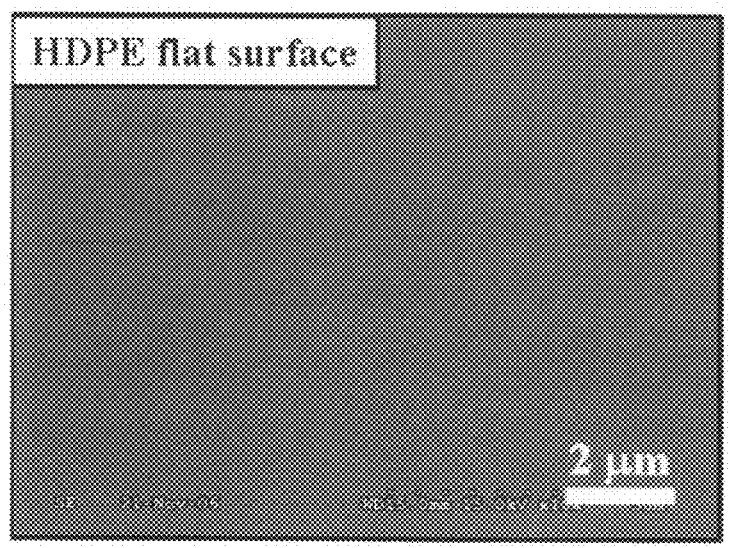
FIG. 6 shows an illustrative embodiment of an FE-SEM photograph of an untreated high-density polyethylene (HDPE) surface.

FIG. 6 shows an illustrative embodiment of an FE-SEM photograph of an untreated HDPE surface. It can be seen that the surface is almost flat over the whole surface.

Figure 7:
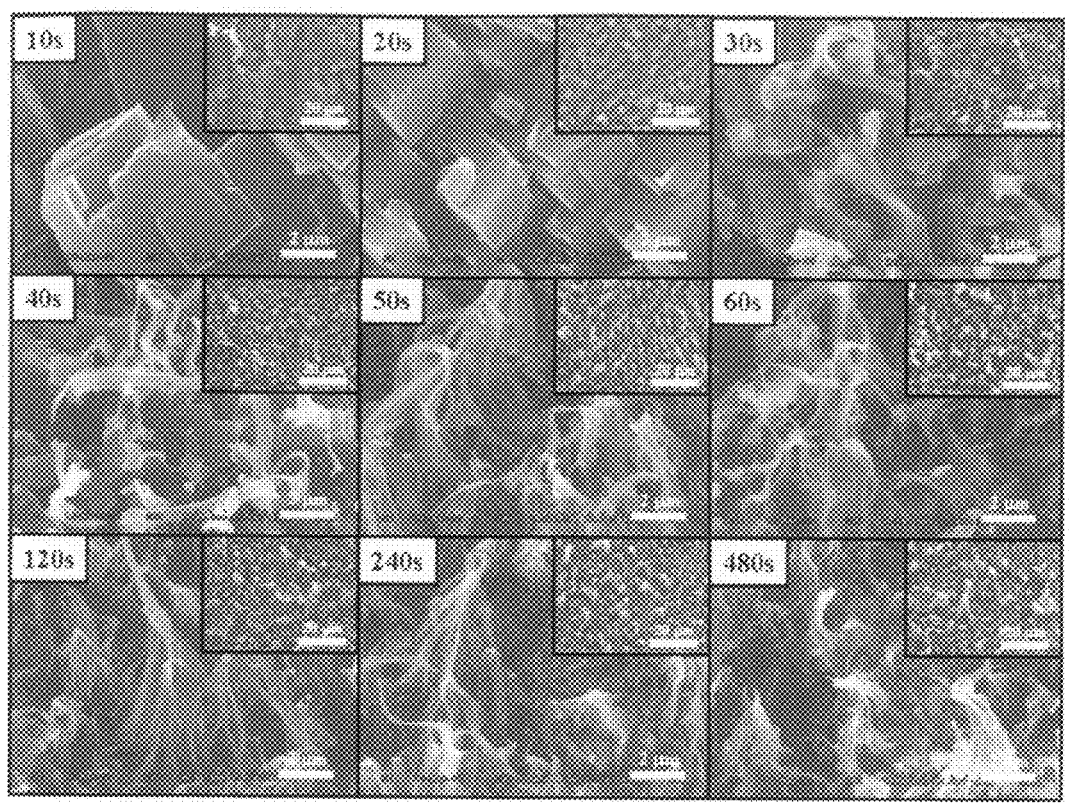
FIG. 7 shows an illustrative embodiment of FE-SEM photographs of surface changes of HDPE polymer fabrications formed using an Al template etched by an etchant for the respective times.

FIG. 7 shows an illustrative embodiment of FE-SEM photographs of surface changes of HDPE polymer fabrications formed using an Al template etched by an etchant for the respective times.

As shown in FIG. 7, when the Al template in which the terrace-like micron-sized structure is formed (i.e., Al template etched for 10 seconds to 30 seconds) is used, the shape of the template is correspondingly replicated in the replicated polymer fabrication. However, it can be seen that the nanostructure of the template is replicated to a grass-like nano-sized fiber structure from the Al template in which the nano-sized structure starts to occur (i.e., Al template etched for 40 seconds to 480 seconds). As the etching time increases, the reaction temperature increases to cause not only the nano-sized structure but also the hierarchical structure of the Al surface to be gradually formed. The polymer melted during the polymer replication procedure is placed over the entire template and then cooled down. When a stripping method is employed for removing the polymer replica from the template, the polymers are lengthened and removed, which thus leads to a grass-like nano-sized fiber structure.

(4) Confirmation of Superhydrophobicity of Replicated Polymer Fabrication

Figure 8:
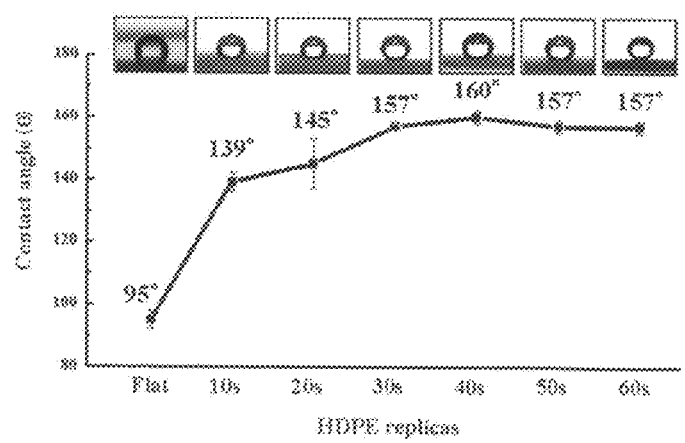
FIG. 8 shows an illustrative embodiment of a graph illustrating static contact angles of a waterdrop with respect to surfaces of the HDPE polymer fabrications.
Figure 9:
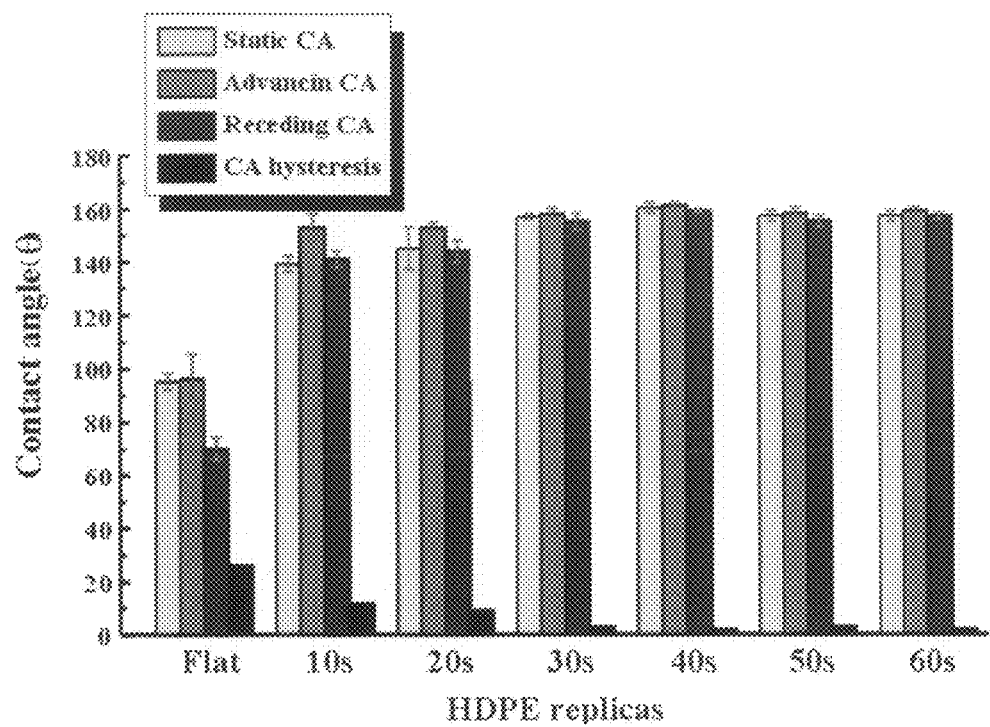
FIG. 9 shows an illustrative embodiment of a graph illustrating static contact angles ($\theta_s$), advancing contact angles ($\theta_a$), receding contact angles ($\theta_r$), and contact angle hystereses ($\theta_a$-$\theta_r$) of a waterdrop with respect to surfaces of the HDPE polymer fabrications.

Contact angles of a waterdrop with respect to the surface of the polymer fabrication were measured to confirm whether the surface of the replicated polymer fabrication exhibits superhydrophobicity. A method disclosed in the document "*Proceedings of the XIVth International Symposium on High Voltage Engineering,* 2005, D-47" by Florian Exl et al. were employed as the measurement method. FIGS. 8 and 9 illustrate average contact angles measured at 9 different points with respect to the respective polymer fabrications.

FIG. 8 shows an illustrative embodiment of a graph illustrating static contact angles of a waterdrop with respect to surfaces of the HDPE polymer fabrications. Table 1 and FIG. 9 shows an illustrative embodiment of a graph illustrating static contact angles ($\theta_s$), advancing contact angles ($\theta_a$), receding contact angles ($\theta_r$), and contact angle hystereses ($\theta_a$-$\theta_r$) of a waterdrop with respect to the surfaces of the HDPE polymer fabrications.

TABLE 1

| HDPE replicas | Flat | 10 s | 20 s | 30 s | 40 s | 50 s | 60 s |
|---|---|---|---|---|---|---|---|
| Static contact angle (deg) | 95 | 139 | 145 | 157 | 160 | 157 | 157 |
| Increment from Flat surface (%) | 0 | 46 | 52 | 65 | 68 | 65 | 65 |
| Advancing contact angle (deg) | 96 | 153 | 153 | 158 | 161 | 158 | 159 |
| Receding contact angle (deg) | 70 | 141 | 144 | 155 | 159 | 155 | 157 |
| Contact angle hysteresis (deg) | 26 | 12 | 9 | 3 | 2 | 3 | 2 |

When the HDPE polymer fabrication has a static contact angle of about 150° and a contact angle hysteresis of 5° or less, the polymer fabrication may be regarded as one having a superhydrophobic surface. As shown in FIG. 8, it can be seen that the HDPE polymer fabrication had a superhydrophobic surface when it was prepared using the Al template etched for a time longer than 30 seconds. In addition, in the case of the HDPE polymer fabrication having a superhydrophobic surface, it could achieve an enhanced effect of $\theta_s$ by about 65% over the flat HDPE polymer plate. In the case of the HDPE polymer fabrication, it was determined that the contact angle hysteresis was not greater than 3° in the replica having a superhydrophobic surface (30 seconds to 60 seconds) so that the replica has a genuine superhydrophobic surface. The results illustrated in FIGS. 8 and 9 indicate that superhydrophobicity is enhanced regardless of the material when the hierarchical structure is gradually formed by changing the structure of the polymer surface.

Experimental Example 1

Confirmation of Stability of Replicated Superhydrophobic Polymer Fabrication

In order to apply the superhydrophobic polymer fabrication in practice, the superhydrophobicity of the polymer fabrication needs to be stable so that the superhydrophobicity of the polymer fabrication is not damaged due to the external environment or contaminants. Accordingly, an experiment was carried out to determine whether or not the superhydrophobic polymer fabrication maintains its stability in various solvents and solutions with various pHs.

First, to test the stability of the superhydrophobic polymer fabrication with various solvents, the HDPE polymer fabrication formed using the Al template etched for 60 seconds in an etchant was dipped into hexane, petroleum ether, toluene, Cl-benzene, methylene chloride, chloroform, THF, EtOH, acetone, MeOH and water for 5 days, the surface shapes of the polymer fabrication were observed, and then the contact angles were measured.

After the HDPE polymer fabrication was treated with various solvents, the surfaces of the HDPE polymer fabrication were analyzed using FE-SEM, and it was found that there is no change between the treated surfaces and the untreated surfaces of the HDPE polymer fabrication.

Figure 10:
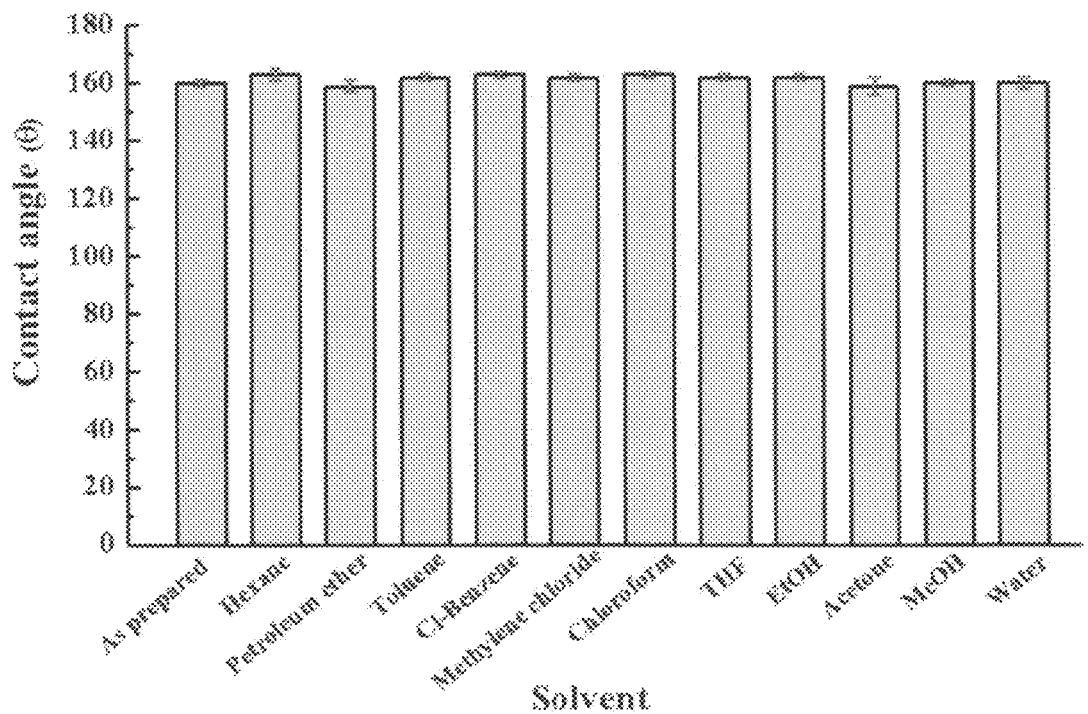
FIG. 10 shows an illustrative embodiment of a graph illustrating contact angles of a waterdrop with respect to the surfaces of HDPE polymer fabrications treated with various solvents.

FIG. 10 shows an illustrative embodiment of a graph illustrating measurements of contact angles of a waterdrop with respect to the surfaces of the HDPE polymer fabrications treated using various solvents. As shown in FIG. 10, the HDPE polymer fabrications exposed to various solvents have a contact angle of about 160° even when the HDPE polymer fabrications have been treated with various solvents. Therefore, the surface of the polymer fabrication is not changed even when it has been treated with various solvents, so it has a stable superhydrophobic property.

Next, to test the stability of the superhydrophobic polymer fabrication in solutions of various pHs, the HDPE polymer fabrication formed using the Al template etched for 60 seconds in an etchant was dipped into a solution with a pH of 1 to 13 for three days, which was then cleaned with water several times, and the contact angles were measured.

After the HDPE polymer fabrication was exposed to a solution with a pH of 1 to 13, the surfaces of the HDPE polymer fabrication were analyzed using FE-SEM, and it was found that there is no change between the treated surfaces and the untreated surfaces of the HDPE polymer fabrication.

Figure 11:
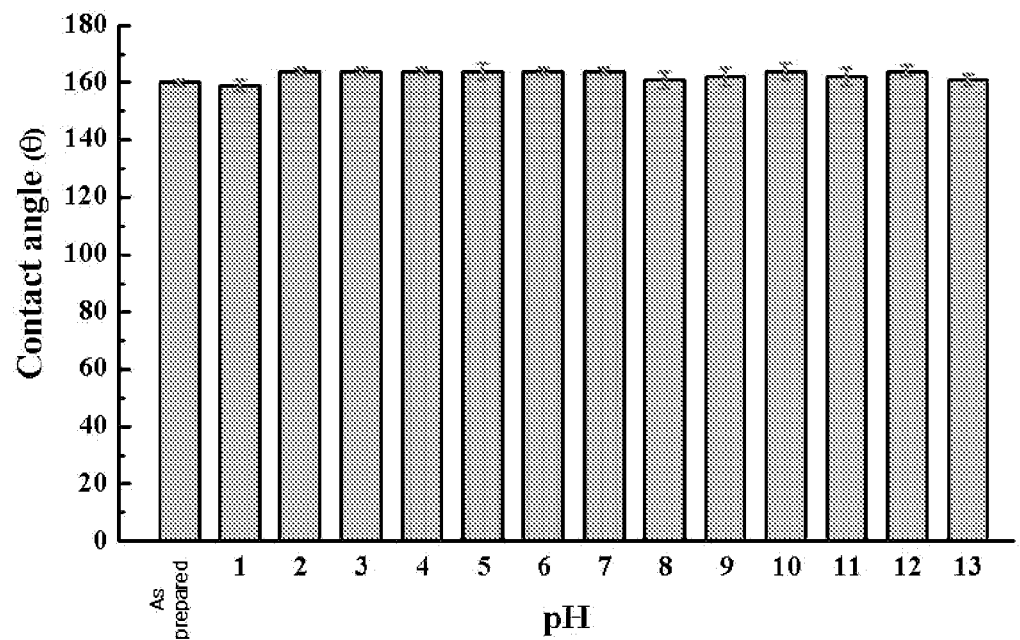
FIG. 11 shows an illustrative embodiment of a graph illustrating contact angles of a waterdrop with respect to the surfaces of the HDPE polymer fabrication exposed in solutions having various pHs.

FIG. 11 shows an illustrative embodiment of a graph illustrating measurements of contact angles of a waterdrop with respect to the surfaces of the HDPE polymer fabrication exposed to a solution having various pHs. As shown in FIG. 11, the contact angle of the waterdrop is hardly changed even when the HDPE polymer fabrication has been exposed to a solution having various pHs for 3 days. Therefore, the surface of the polymer fabrication is not changed even when it has been treated with a solvent having various pHs, so it has a stable superhydrophobic property.

Experimental Example 2

Confirmation of Self-Cleaning Effect of Replicated Superhydrophobic Polymer Fabrication The superhydrophobic surface exhibits a self-cleaning effect which may remove contaminants by itself. In order to confirm whether the surface of the polymer fabrication prepared as described above exhibits the self-cleaning effect, activated carbons were uniformly put on the surface of the HDPE polymer fabrication, and waterdrops were then dropped onto the surface one by one using an injector. As a result, the activated carbon was removed by the waterdrops on the surface of the polymer fabrication tilted at a predetermined angle (2° to 5°). The above procedure was recorded by a digital camera.

Figure 12:
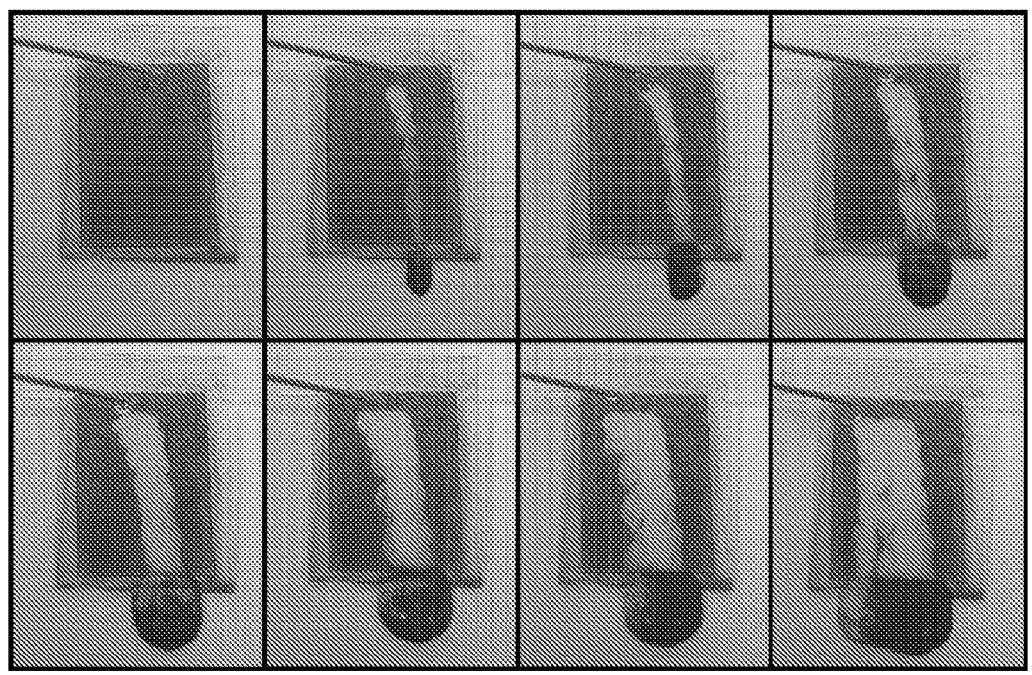
FIG. 12 shows an illustrative embodiment of continuous photographs of a procedure in which activated carbon put on a surface of an HDPE polymer fabrication is removed by waterdrops.

FIG. 12 shows an illustrative embodiment of continuous photographs of a procedure in which activated carbon put on a surface of HDPE polymer fabrication is removed by waterdrops. As shown in FIG. 12, the superhydrophobic surface of the HDPE polymer fabrication formed by the example exhibits a self-cleaning effect.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method of preparing a superhydrophobic polymer fabrication, comprising:
    forming a micron-sized terrace structure on a surface of a template and a nano-sized groove structure within the terrace structure by chemical etching, wherein the micron-sized terrace structure comprises irregularly distributed fragments;
    applying heat and pressure to a polymer placed on the etched template to replicate a polymer fabrication from the etched template; and
    removing the replicated polymer fabrication from the template.

2. The method of claim 1, wherein the micron-sized terrace structure and the nano-sized fiber structure within the terrace structure are formed on a surface of the polymer fabrication.

3. The method of claim 1, wherein the chemical etching comprises using an etchant of at least one solution selected from the group consisting of $HNO_3$, $H_3PO_4$, $H_2SO_4$, $H_2CrO_4$, HCl, HF, $NH_4OH$, NaOH and KOH.

4. The method of claim 1, wherein the chemical etching is performed at a temperature ranging from 0° C. to 100° C.

5. The method of claim 1, wherein the chemical etching is performed for a time ranging from 1 second to 10 minutes.

6. The method of claim 1, wherein the replicated polymer fabrication comprises a surface with a static contact angle of about 150° or more.

7. The method of claim 1, wherein the template is metal.

8. The method of claim 1, further comprising applying heat and pressure to a second polymer contacting the template to replicate a second polymer fabrication.

9. A method of preparing a superhydrophobic polymer fabrication, comprising:
    providing a template comprising a micron-sized terrace structure and nano-sized groove structures within the micron-sized terrace structure, wherein the micron-sized terrace structure comprises irregularly distributed fragments, and wherein the template is formed by chemical etching; and
    applying heat and pressure to a polymer contacting the template to form the polymer fabrication, wherein the polymer fabrication comprises a surface with a static contact angle of about 150° or more.

10. The method of claim 9, wherein the chemical etching comprises using an etchant of at least one solution selected from the group consisting of $HNO_3$, $H_3PO_4$, $H_2SO_4$, $H_2CrO_4$, HCl, HF, $NH_4OH$, NaOH and KOH.

11. The method of claim 9, wherein the chemical etching is performed at a temperature ranging from 0° C. to 100° C.

12. The method of claim 9, wherein the chemical etching is performed for a time ranging from 1 second to 10 minutes.

13. The method of claim 9, wherein the template is metal.

14. The method of claim 13, wherein the metal is aluminum.

15. The method of claim 9, further comprising applying heat and pressure to a second polymer contacting the template to replicate a second polymer fabrication, wherein the second polymer fabrication comprises a second surface with a static contact angle of about 150° or more.

16. The method of claim 9, wherein the method does not include photolithography.

17. The method of claim 9, wherein the template is not a plate shape.

18. The method of claim 17, wherein the template is cylindrically shaped.

* * * * *

UNITED STATES PATENT AND TRADEMARK OFFICE
CERTIFICATE OF CORRECTION

| | | |
|---|---|---|
| PATENT NO. | : 7,887,736 B2 | Page 1 of 1 |
| APPLICATION NO. | : 12/234560 | |
| DATED | : February 15, 2011 | |
| INVENTOR(S) | : Lee et al. | |

It is certified that error appears in the above-identified patent and that said Letters Patent is hereby corrected as shown below:

Title Page,

On the Face Page, in Field (56), under "PUBLICATIONS", in Column 2, Line 1, delete ""Fabricatino" and insert -- Fabrication --, therefor.

On the Face Page, in Field (56), under "PUBLICATIONS", in Column 2, Line 6, delete "arrary" and insert -- array --, therefor.

In Fig. 9, Sheet 5 of 6, delete "(θ" and insert -- (θ) --, therefor.

Signed and Sealed this
Seventeenth Day of April, 2012

David J. Kappos
*Director of the United States Patent and Trademark Office*